July 2, 1968  K. GREBE  3,390,915
GUIDED CUTTER CHAIN FOR MINING USE
Filed Oct. 13, 1965  8 Sheets-Sheet 1

INVENTOR
KONRAD GREBE

BY
*Fraser & Fraser*

ATTORNEYS

July 2, 1968  K. GREBE  3,390,915
GUIDED CUTTER CHAIN FOR MINING USE
Filed Oct. 13, 1965  8 Sheets-Sheet 3

INVENTOR
KONRAD GREBE
BY
ATTORNEYS

July 2, 1968          K. GREBE          3,390,915

GUIDED CUTTER CHAIN FOR MINING USE

Filed Oct. 13, 1965          8 Sheets-Sheet 7

*INVENTOR*
KONRAD GREBE

BY

ATTORNEYS

United States Patent Office 3,390,915
Patented July 2, 1968

3,390,915
GUIDED CUTTER CHAIN FOR MINING USE
Konrad Grebe, Untergrunewalder Strasse 3,
Wuppertal-Elberfeld, Germany
Filed Oct. 13, 1965, Ser. No. 495,554
Claims priority, application Germany, Oct. 6, 1965,
G 41,808
13 Claims. (Cl. 299—32)

ABSTRACT OF THE DISCLOSURE

An endless cutter chain for a long wall mining machine adapted to discharge the mineral at areas along the floor and the roof of the seam. The cutter chain is guided in guide rails carried by an advanceable support framework and the rails are adjustable and securable as to the angle of inclination of the individual chain guide sections with respect to the horizontal. The endless cutter chain produces channels in the face of the seam and the channels are cleared by tools carried by the chain. Wedge-shaped tools also carried by the cutter chain enter the seam and attack the face by forcing the mineral against the roof whenever the wedging tools are progressing along the channel adjacent the floor and by forcing the mineral against the floor whenever the wedging tools are advancing within the channel along the roof. Thus a cutter chain is arranged to run at the top and at the foot of the face in guides which comprise interarticulated rail sections arranged upon members of an advanceable support framework. The inclination of the individual cahin guide sections can be adjusted so as to change the angle of attack.

This invention achieves the advantage of an accelerated progress independently of the hardness of the mineral and the irregularties of the seam. A plane is prepared along the floor and along the roof for the continuous and smooth progress of the adjustable support framework as well as of the conveying system. The adjustability and settability of the guide rails enable the excavation to progress with a high degree of precision and also enables the determination at any time of the direction and the plane of progress in a manner unknown to the prior art. This makes possible a mining apparatus which can develop a maximum of mechanical power with a minimum of labor and with a high degree of safety and reliability without being impeded by irregularities of the seam so that working of the whole mine may be concentrated upon one and two points of long wall mining.

The invention relates to apparatus for the mechanical extraction of coal and other minerals occurring in seam formation by the long way method with advancing support of the excavated space.

An extraction apparatus has already been proposed having a cutter chain guided throughout the entire length of the face and arranged to run at the top and foot of the face in guides comprising rail sections arranged upon the framework of an advancing support system and upon support means for a conveyor associated with the said framework.

In a known mode of operation the sections of the rail in which the cutter chain is guided are rigidly connected at the foot wall with the conveyor and at the top wall are connected through resiliently movable intermediate members to the cap-like support members of the face support system so that they can resiliently deflect with inequalities of the top wall. The cutter chains are therefore automatically held in the range of the coal face and are prevented from penetrating into the rock strata at the roof or the floor. This has always been accepted as obvious because the object is to extract coal and not to extract rock. In fact in the practice of the long wall method of excavation it has not been possible to get away from the prejudice that for the excavation of coal other machines are necessary or desirable than for the purpose of cutting through rock even though machines have long been employed, for example in the driving of mine roadways, which operate just as well in rock as in seams.

The present invention breask away from such prejudice. The invention proceeds upon the concept that the enormous financial expenditure which is incured by the equipment of a single face with an advancing hydraulic support system can only justify itself if the coal winning method involved with this support system will ensure a very great advance in the excavation, which cannot be materially hindered, at least in tempo, even by the geological disturbances which can never be excluded with any certainty from such winning operations.

Accordingly an object of the invention is to provide a fully continuously operating extraction apparatus, which, whilst having a large output and a completely uniform advance of the face, is to a large extent independent of the strata conditions, i.e. variations in the dip, the thickness of the seam and specially also of disturbances, and therefore is not subject to an interruption of the extraction operation in the event of such variations in the conditions.

More particularly an object is to provide an extraction apparatus for long wall working which is capable of cutting through not only the coal but also the rock, and which together with functionally cooperating support and conveyor elements, can clear a path in such a manner that upon encountering geological disturbances no interruption of the operation needs to take place and such that in any case the long wall face can be continued through the zone of disturbance without any time consuming operations of putting the system out of and again into service and without the capital expenditure necessary for a completely rearranged operation. Any abnormal increase in rock and a corresponding decrease in coal during extraction in the particular excavation period is not of economic importance as compared with the advantages of having an uninterrupted operation and can easily be taken into account. It is self-evident that should it become necessary to attack the rock strata the route will be so chosen that it will pass through the floor in the case where there is a hard roof and a soft floor and, in the reverse case, will pass through the roof.

A further object is to provide an extraction apparatus which, whilst using support means adapted to keep the cutting equipment to the face at a desired angle will permit the support means for the cutting equipment to be driven forward by fluid pressure means associated with the main roof support system at the coal face side thereof and using the member of such main roof support system as an abutment.

Finally an object is to make it possible to carry out coal extraction operations without any expenditure in manual labour, apart from the necessary supervision, in a manner which approaches very closely the ideal solution of the "unmanned face" long sought-after in the mining industry.

With these objects in view the apparatus for the mechanical extraction of coal and other minerals occurring in seam formation by the long wall method of working comprises a cutter chain arranged to run at the top and at the foot of the face in guides, said guides comprising interarticulated rail sections arranged upon members of an advanceable support system, means for advancing said guides together with their support system toward the face and means associated with said support system for effecting angular adjustment and setting with respect to the horizontal of the inclination of the individual chain guide sections and hence of the angle of attack with respect to the coal face of the cutter chain flights moving along said cutter chain guides.

The angular adjustment and setting mechanism will be arranged in the vicinity of the roof caps and sole plates of the support members adapted to carry the guide rail sections, said sections having a connection through an intermediate anchorage to a rigid intermediate member associated with the roof cap or sole plate of the respective support member whereby such anchorage can be swung or tilted with respect to the rigid intermediate member.

In operation the support members with which the chain guides and adjusting mechanism are associated are yieldably set with a load sufficient to allow the cutter chain running in the cutter chain guides to bear against the top wall and foot wall of the face, such load being overcome, however, by a fluid pressure advancing device bearing against support frames of the main roof support system set under full load.

This construction and arrangement of the extraction apparatus makes possible a method of extraction, wherein upon encountering disturbances the cutter chain guides are swung into a position relative to the framework which supports them so as to make possible a transition from the level of one part of a seam to that of another part of the seam whilst cutting through the roof or the floor whilst the cutter chain guides are locked in this position and thereby the cutter chain is prevented from deviating into softer strata.

In accordance with a further feature of the invention, there are provided between the upper flight and the lower flight of the cutter chain additional extraction devices operating with a cutting, stripping or grooving action and being adjustable in height in dependence upon the deflection of the cutter chain guides and upon the available height of the seam.

The unitary sections of the rail forming the guides for the cutter chain and the extraction device operating in the region between the two flights of the cutter chain may be supported upon props situated at the coal face side of the advancing frames of the main roof support system, in the case where such extraction device operates with a cutting or stripping action.

In the case where the additional extraction device has a grooving action and the members of the cutter chain are designed as links which run in a guide formed as a U-shaped rail, the said additional extraction device is slidingly supported upon a flange of this guide extended for this purpose and bears against the foot wall and the top wall.

According to a constructional form of the apparatus, which is intended particularly for the excavation of seams of small thickness, instead of using a single endless cutter chain traversing the top wall region and the foot wall region, separate cutter chains are employed which are guided at the top wall and at the foot wall around guide sprockets arranged parallel to the said top wall and foot wall, of which cutter chains only one is fitted with excavating tools having a grooving action. In this way the difficulty is avoided, conceivable in seams of small thickness, wherein the grooving excavation tools extending upwardly from the lower cutter chain and extending downwardly from the upper cutter chain might mutually interfere or come into contact with each other.

Since the space over which the advancing support system is moved is cleared by the cutter chain along the floor as well as along the roof and since the setting load of the support frames yieldably clamped between the floor and the roof can be maintained uniform, the disturbances and irregularities which tend to restrict the advancement of a roof support system are substantially removed, and also the energy required for the advancement of the support frames can be kept more uniform than was possible with the formerly known excavation and support methods. This is a further important condition for the automation of the extraction and support operations, and to that extent advantages are achieved by the described extraction method with support frames yieldably clamped between the roof and the floor, which frames are themselves driven forward by driving means anchored against support members set with full load.

In the use of the extraction apparatus the drive and guide pulley arrangements of the cutter chain can be set up in the mine roadway, and it is not necessary in the design to take into account the cramped conditions at the coal face, so that by installing a larger machine power the extraction output can also be increased. In a known mode of working wherein face support members are employed and caterpillar types of mechanisms are associated with the roof caps and sole plates of such support members connected by hydraulic props so that by means of a drive imparted to these caterpillar mechanisms the system may progress along the top wall and foot wall, the support members at the face are not of themselves able to take the full pressure of the roof, and therefore require in addition a normal type of roof support system, but a satisfactory functional connection between the advancing operations of the two different types of support systems cannot be achieved.

The apparatus herein described avoids the serious disturbances and operational difficulties which occur when support systems of two different types are required to co-operate in the same long wall face, and wherein the advance of the one system coincides with the advancement of the excavation, the advancement of the other system can be inadvertently impeded.

The support frames which are directly connected to the mineral excavation devices can be combined with other support frames of the advancing support system to form a truss so that whilst the frames are being advanced which are connected to the excavation devices, the other frames constitute an abutment therefor. The frames directly connected to the excavation devices may however also be carried upon trusses or support chocks of an advancing support system such that, whilst the advancement of these trusses or chocks is independent of the frames connected to the excavating devices, the drawing forward of the latter is dependent upon the advancement of the support system. In any case the frames associated with the excavating equipment must be carried upon frames (trusses or support chocks) of the advancing support system in such a manner that the roof caps and/or sole plates of the frames carrying the excavating devices are deflectable at least in the vertical plane as compared with the corresponding elements of the remainder of the support system, because these roof caps and sole plates must be able to follow any variation in the inclination of the drive direction of the cutter which is caused by variation of the angular position of the cutter chain guides with respect to the roof or the floor.

The new extraction apparatus is superior to the known apparatus not only when disturbances are to be penetrated, because it is by no means the sole advantage of the apparatus that it permits cutting through such faults, but under normal geological conditions it is also of great benefit for regulated and satisfactory advance in extraction technique, which is not impaired by an undulating course of the seam or by differences in hardness of individual strata of the seam or of differences as between these strata and the roof or floor, whilst the special features whereby it is distinguished as compared with the known apparatus involve no substantial increase in capital outlay. The control devices for the cutter chain guides are comparatively simple devices of moderate cost.

The increase in the advance of excavation achievable by the new extraction apparatus, which does not merely make possible a corresponding rapid advance of the entire support system but, in its preferred form of construction, in fact makes this inevitable, naturally also involves at the waste side a mode of working suited to the rapid advance of the working face.

The successive unit sections of the cutter chain guides are so connected to each other that they are mutually deflectable to a certain degree in all directions. For this purpose they may each be provided at their ends with a half round bolt, so that the two half round bolts of two adjacent sections of the rail together form a single round bolt extending substantially parallel to the caps of the frames, which bolt is accommodated in a circular hole in an anchorage member. By this common anchorage member the connecting members of the rail sections are centered. The half round bolts are, however, so designed that they have a sufficient mutual clearance in the anchorage in order to make possible a relative deflection of the rail sections to the required extent.

The cutter chain will run without any difficulty over these junction points when the guide tracks in these rail sections have at these points corresponding flared extensions. The anchorage member for the half round bolts is itself pivotable in the vertical plane with respect to the appertaining support frame. This anchorage member may for example be in the form of an angle section iron bar, which, by means of a bolt mounted thereon extending parallel to the axis of the cutter chain, is pivotable upon an associated intermediate member and by means of an adjusting device is thereby adjustable into the desired angular position. This adjusting device can be supported upon the said intermediate members or upon the props at the coal face side or even upon the caps of the appertaining support frames.

If the additional extraction device operates with a stripping action, then its range of operation should be suited to the height of that part of the coal face available between the two cutters constituting the main cutter chain. This additional extraction device should extract the material in a condition ready for loading in order to avoid the conveyor disturbances which are known to occur when large blocks come down during planing operations. The stripping depth is determined by the speed of advancement of the main cutter chain and it is therefore, in any case, only small. If therefore the face is stripped simultaneously over its entire height then large lumps cannot result. Furthermore the cutters available at the floor and the roof levels will facilitate the operation of the stripping tools.

In order to avoid as far as possible a variable loading of the conveyor caused by the ascent and descent of the stripping tools there will be provision in any case for a large difference in the relative speeds of the stripping tools and the conveyor and importance will be placed upon the quick change between ascent and descent of the stripping tools which is preferably made possible, for example, by arranging that the stripping tools allocated to each section of the face length are arranged in series and are given a cutting reciprocating action by a common actuating means whilst the regions swept thereby preferably overlap. For this purpose in accordance with the invention a plurality of stripping tools are united to form a group and are arranged upon an articulated frame, whose upper and lower connection points are guided along the rail guides of the main cutter chain flights, so that the width of this articulated frame, which is pushed forward through the props at the coal face side, can be suited automatically to the spacing between the two flights of the main cutter chain as determined by the thickness of the seam.

The stripping tools themselves are bodies in the form of conical frusta which can cut in all directions.

If these bodies are provided at their cutting edge with teeth and if, according to a particular feature of the invention, these bodies are rotatable about their axes, then they will begin to rotate as soon as they encounter resistance at one side thereof, which motion enhances the stripping work performed thereby. The articulated frames, upon which these tools are arranged, are preferably designed as quadrilateral linkages, upon whose opposite limbs the stripping tools are arranged in staggered formation with respect to their height. The regions of the face in which the stripping tools of the group operate can accordingly overlap each other, whilst a stripping tool can also be arranged at the upper and the lower connection point of the frame.

Upon reciprocation the stripping tools the reaction forces opposing a uniform feed of the forwardly advancing frame will vary. In order nevertheless to ensure a uniform advance of the cutter chain running through the successive sections of the pivotable rail guides, it can be arranged that the supply line for the pressure medium which feeds a plurality of driving devices for the frames, will be provided with dosing devices in the branch lines leading to each of the fluid pressure operated driving devices so that equal quantities of pressure medium are distributed to each of said driving devices independently of the pressure which is to be overcome thereby.

A still further improved and simplified arrangement for ensuring the uniform forward feed of the cutter chain may be realised by a different advantageous construction of the apparatus in accordance with the invention, in which the extraction operation, as such, is performed by a grooving operation—whilst at the same time maintaining the principle of cutter chain guides which are deflectable and which can be locked in the deflected positions thereby determining the working direction of attack of the cutter chain—and in this case the cutter chain itself forms the support and actuating member for the grooving action excavation tools mounted thereon. This constructional form of the invention is moreover particularly suited for the penetration of even the hardest rock strata.

In the case of this practical form of the invention the cutting tools are so arranged upon the cutter chain that they produce at the face side a channel which is in advance of the excavated face produced by the grooving action tools, and intermediate members preferably designed as lateral delivery clearing tools are fixed upon the members of the cutter chain which are designed as links, these intermediate members having a surface bearing against the face being excavated, which consequently limits the forward feed of the support system and the pivotable and linkable guides for the cutter chain jointed thereto and consequently also limits the penetration depth of the cutting members into the advance channel.

It is also already known, for the purpose of making a channel through the seam, to arrange between the cutter picks upon the cutter chain clearing tools of the ploughshare type engaging in the channel, which tools deliver the small cut material laterally and rearwardly from the channel. According to the invention these clearing tools or other intermediate members arranged between the members of the cutter chain, appropriately formed as links, and the cutting elements, are given the function of supporting the cutter chain and its guides upon the face produced by the actual grooving action excavating device, that is to say not the face formed by the cutting action members, but rearwardly of the channel and situated as regards the foot wall above the channel and, as regards the top wall, below the channel, and in this way to determine the position of the channel, with respect to which the grooving action excavating tools exert their grooving action, with respect to the said working face.

In this constructional form of the invention the forward feed of the cutting elements is fully independent both of the alternating pressure forces operating upon the support system and the changing hardness of the minerals which are being cut. The establishment of pressure forces is avoided, which could drive the cutting tools to a greater depth than is provided into the seam or else into the adjacent rock of the seam and thereby subject the cutting tools to an excessive load. It therefore becomes possible, even when using a minimum penetration depth of each individual cutting element, to achieve a fully uniform and reliable forward feed of the cutter chain which fact is of particular importance in the practical cases which are typical of this constructional form of the invention, namely those cases when the cutter chain is required to operate along certain sections of the long wall front in the seam and in other sections through the neighbouring rock. At the same time by virtue of this fact and by virtue of the clearing of the channel from small cuttings, the possibility is opened up of equipping the cutting elements with the very hardest cutting tools, for example with diamonds or else of designing these tools as rotary chisels, without any accompanying danger of damaging these cutting tools by an irregular penetration depth or an irregular feed velocity or by the presence of intervening small cuttings.

A further advantage of this practical form of the novel extraction apparatus lies in the fact that because the grooving action tools are arranged upon the cutter chain guided at the top wall and the foot wall, are likewise carried upon the guides for this cutter chain and by means of these guides are brought to bear against the top wall and the foot wall of the face, consequently no additional driving members are required for these grooving action tools and no auxiliary support means are required acting in the direction of the open face. For the working of thick seams it is of particular advantage that the grooving action tools operating in a direction from the floor to the top wall shall operate in a similar manner from the top wall in the direction towards the floor when returning in the other flight of the cutter chain. Because a support of the extraction device at props at the face side is no longer necessary, the deflection of the rail sections guiding the cutter chain will be effective without the interposition of these props. This feature will be described in more detail in the following with further features of the invention.

As above described, the surface of the clearing tools bearing against the excavated face forms a kind of seal with respect to the face which prevents the falling back of the small cut material into the channel. At the upper end of this surface it is possible to connect, in a known manner, deflector plates which convey the small cut material discharged from the channel into the conveyor. However it is possible to arrange the clearing tools in such close sequence with respect to each other that the small cut material discharged therefrom, in so far as it may fall behind them in a direction towards the channel, will not in fact again reach the channel but will in fact fall upon the discharging surfaces of the next following clearing tool. The channel is therefore not only cleared of small material by the clearing tools but is maintained completely free.

The penetration depth of the cutting tools which form the advance channel is controlled by the forward displacement of the cutting elements with respect to the surface bearing against the excavated face by an amount which varies from section to section of the cutter chain but which is constant for each of said sections.

The clearing tools and intermediate members associated with the respective succeeding sections of the cutter chain have a thickness, which as regards the parts bearing against the excavation face decreases in the direction of travel and, as regards the parts arranged between the chain links and the cutting elements and extending into the channel have a constant thickness, and as a result the cutting elements associated with the various sections of the cutter chain always project for the same distance with respect to the links of the cutter chain but different distances with respect to the excavated face. Thus the cutting elements associated with a following section of the cutter chain will penetrate inside the channel always by such greater depth as—externally of the channel—the decrease in the thickness of the clearing tools and intermediate members with which they are associated, for example from one section to the following section this increase in depth will be 1 mm.

In order that these increments, even though they may be small, shall not influence the accurate course of the cutter chain, it is possible so to design each of such sections of the cutter chain, consisting for example of four links, that in this range the spacing of the excavated face to the plane in which the cutting elements operate will in fact remain constant, but the spacing of this plane from the rear wall of the guide rail will decrease by the above-mentioned amount (1 mm.). In this connection it is immaterial in principle whether this effect is achieved by making each clearing tool thinner by this amount from one end to the other or by making thinner the links with which the clearing tool is associated. The next section of the cutter chain then begins with precisely the same spacing between the rear wall of the guide rail and the excavated face, but the cutting elements are forced 1 mm. deeper into the channel. The channel is thus deepened stepwise, but each cutting element taken by itself operates over the entire length of the face at the same step and therefore leaves a trench of the same depth over the entire length of the face.

To the same extent as this trench increases in depth, the entire face equipment advances forwardly under the influence of driving devices. The extended flange of the guide rail for the cutter chain, whose forward edge initially lies exactly underneath the working face (and at the top wall lies above the working face), will therefore again be driven into the channel with the deepening of said channel, but its distance from the trench will always remain the same. Consequently after the channel has reached a given penetration depth, before a further deepening can be carried out the excavated face must be advanced by a corresponding amount. Since this penetration depth is precisely determined by the number of cutting elements which have been effective, the grooving cutting tools which have the function of advancing the excavated face are preferably arranged at corresponding distances with respect to the cutter chain, and in fact they are fixed like the clearing tools upon the links of the cutter chain, slide exactly like these upon the extended flanges of the guide rails and remove the face by grooving from the channel, whilst they are supported in an advantageous manner at the foot wall and the top wall by means of the said flanges.

In order that the cutter chain together with the clearing tools and grooving tools mounted thereon shall be able to pass round at the reversing points at the ends of the face, the individual parts of these tools are so designed that they are connected together by means of arcuately shaped surfaces so that they may rotate relatively in accordance with the deflection of the chain links.

At the forward end both of the grooving tool as well as of the clearing tool there is mounted a shoe, which extends into the channel and by means of surfaces which deflect the small cuttings from the foot wall and the top wall and from the base of the channel operates to clear that part of the channel adjacent the extended flange. By means of these surfaces, which are of ploughshare formation, the small cuttings are discharged into the space above the extended flange (and in the case of the top wall are discharged into the space underneath the extended flange) and in fact at that point where the forward edge of the grooving tool or the clearing tool slides upon the flange. These small cuttings are again carried along by the upwardly inclined surface of the grooving tool or the clearing tool. In the case of the grooving tool the shoe mounted thereon is only required to perform the function of preventing small cuttings from falling back into the channel, but in the case of the clearing tool the shoe must, by means of further guide surfaces, deflect the small cuttings out of that part of the channel which is situated above the extended flange (in the case of the top wall situated below the extended flange) into the space between the face being worked and the links of the cutter chain. In this space the small cuttings are further transported by the clearing tool.

The point of the shoe is in each case arranged approximately underneath the forward pivot axis of that flange of the cutter chain, with which is associated the forward part of the grooving tool or clearing tool. If the point of the shoe were to be situated more forwardly than this then the point would spike into the trough of the channel in the case of an undulating foot wall or top wall, because it would then project out beyond the deepest part. However if the point of the shoe were to be arranged further to the rear then the channel would not be completely cleared in the case of irregularities.

According to an advantageous form of construction of the invention all of the tools are designed to be in three parts and to be associated with three succeeding links of the cutter chain. Both the grooving tool as well as the clearing tool are provided with a wedge surface rising from the extended flange of the guide rail into the space above it and also into the space above a bar fixed to the guide rail and extending over the conveyor, said wedge surface being inclined towards the open long wall face. However in the case of the grooving tool this wedge surface runs underneath the face being worked which is thereby grooved by the said tool. In this case the space between the face being worked and the links of the cutter chain can be covered over by an abutment wall mounted upon the wedge in the case where the pressure forces with which the grooving tool operate from the channel in the direction towards the roof or the floor are to be further increased. On the other hand in the case of the clearing tool, the actual body of the tool is arranged between the face being worked and the links of the cutter chain so that in this space it operates upon the small cuttings and by means of its rising surface discharges it from this space. The grooving tools have at their edges, that is to say above the edge of the extended flange, and preferably extending over their entire length, a cutter provided with a clearance angle. Also the clearing tools are preferably provided over the entire length of their edge, extending in this case along the available face, with cutters mounted thereon but these cutters are not provided with a clearance angle and do not project towards the working face. These cutters only come into effect when the lower guide rail of the cutter chain is inclined towards the floor or where the upper guide rail is inclined towards the roof.

By virtue of the inclination of the clearing tool with respect to the face the cutter mounted upon the top edge thereof will automatically acquire a clearance angle. However the cutter which is associated with the grooving apparatus, which cutter is in operation under all conditions and must always be able to cut freely, must therefore have angular clearance under all conditions. Because the clearing tool following the grooving tool has the same thickness as the grooving tool, the advance of the face being worked has no direct influence upon the tempo of the advance of the entire face equipment. This depends rather upon the decreasing thickness of the clearing tools bearing against the face being worked. If the entire cutter chain is fitted with such clearing tools then consequently the advance at the top wall and the foot wall is uniform although at the top wall and the foot wall the extracting tools move in opposite directions.

With the extraordinarily rapid advance of the excavation which is made possible by the extracting apparatus it is necessary to fit the cutter chain with cutting elements, clearing tools and an extraction tool only over a part of its length or in two mutually displaced parts whilst the other parts of the chain may be allowed to run empty. In this case the advance at the top wall is completed in different regions and periods than the advance at the foot wall. Consequently care must be taken to provide that the forward drive devices provided in the region of the top wall can operate independently from the forward driving devices provided in the region of the sole plates. A certain inclination of the position of the props with respect to the caps must in fact be possible with a moving support system such as is required to cooperate with the extraction apparatus in accordance with the invention, and this inclination must be available both in the drive direction as well as transverse to the drive direction. By using a sufficient compression force the effect is achieved that after each circuit period of the cutting elements the same excavation advance is achieved at the roof and at the floor although in the one place soft coal is being operated on and in the other place quite hard adjacent rock.

The cutting elements are therefore so designed that their cutting tools can penetrate even the hardest rock strata, whilst the extent of the penetration thereof is independent of the hardness of the material being cut by virtue of the above described surface support provided by the clearing tools on the face being worked. This arrangement and the freeness of the channel from small cuttings also provide the possibility of designing the cutting elements as rotating chisels or of mounting diamonds thereon as the cutting tools without there being any risk of a detachment of the diamonds from their mountings or other damage and losses. In this case the cutting tools are arranged upon studs so that the small cuttings released thereby cannot block the channel but are distributed therein until discharge therefrom by the next clearing tool. The studs are mutually staggered at their free outer sides transverse to the advance direction of the cutting element so that longitudinal grooves are formed over the entire width of the channel. Where areas of the face still remain standing between these grooves, these are engaged by the cutting tools of the following cutting element. In order to prevent these tools from deflecting into the grooves, the next following cutting element is provided in positions in front of and between the studs arranged thereon, with comb-like projections which engage in these grooves and thus control the engagement of the cutting tools in such a manner that they must operate adjacent the available grooves.

Upon the succeeding cutting elements the comb-like projections are correspondingly wider so that finally the entire surface is uniformly worked. Now the channel is cleared by the next following clearing tool, with which is associated again a group of similar stripping elements projecting further forward, for example by 1 mm.

In this last described practical form of the invention it is necessary to have a design, now to be described, which is different from the first described construction, both in respect of the individual elements connecting the rail sections of the cutter chain guide as well as of those members through which these elements are linked to the roof caps and sole plates of the movable support system and which are to be brought into a definite position with respect to these caps.

In the normal case the trench proceeds along the foot wall and the top wall of the seam forwardly and thus remains substantially in that plane in which the sole plates (and the roof caps) of the support system are arranged. The cutter chain guides arranged at the floor are connected to the sole plates by plates secured rigidly to the guides. If the trench is to penetrate into the floor then the extended flange of the guide rail, which in fact bears against the foot wall can only be brought into the desired new position by arranging that the plates which are connected to the rail section have those ends raised which are connected to the sole plates. If however the drive direction of the trench is to be deflected in a direction towards the roof, then conversely the guide rail itself is to be raised and that end of the plates connected to the sole plates must be maintained at the floor.

These plates are connected to the sole plates of the support system by means of pivoted arms, which have one pivoting axis arranged upon the plate and one pivoting axis upon the sole plate. A device for adjustment of height position operates upon that pivot axis which is arranged upon the plate. Because the adjacent ends of two succeeding rail sections must always lie at the same height position, it is appropriate to associate a common adjusting device with the plates which are arranged at these ends of the two rail sections. By virtue of the fact that the other ends of the two rail sections, again in common with the rail sections which succeed them, are fitted with independently adjustable adjusting devices, it is possible mutually to deflect the succeeding rail sections in the vertical plane.

By the provision of joints between the adjacent plates which are associated with these rail sections, the interconnection of the parts can be still further improved In addition to the adjusting device operating upon the end of the plates a further adjusting device is provided for raising the guide rail. This consists appropriately of an adjusting device connecting the roof caps with the extensions of those sections of the guide rail situated at the floor. Those sections of the guide rail arranged at the roof can be connected in a similar way with the advancing support system and in fact they require an adjusting device operating upon the end of the plate associated therewith (or operating upon suitable levers), said adjusting device being in the region of the prop at the face side—above the end of the sole caps—and an independently operating adjusting device in the region of the forward end of the roof caps.

Further details and features of the invention as well as of the method made possible thereby for penetrating the top wall or the foot wall upon encountering faults will now be described with reference to the accompanying drawings wherein:

FIGS. 9 and 10 illustrate the mode of working when penetrating faults.

Figure 7:
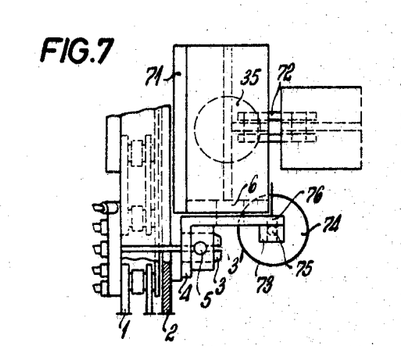
FIGS. 7 and 8 show details of the method of securing the rail sections of the main cutter chain in various views and upon an enlarged scale.
Figure 8:
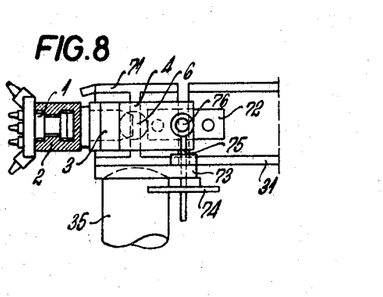
Figure 9:
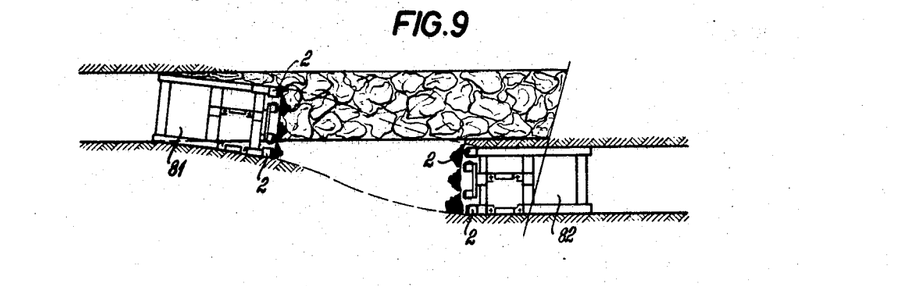
FIG. 9 shows a fault directed in the course of the seam in cross section and FIG. 10 shows a fault occurring in the dip and the corresponding part section of the long wall face in longitudinal section.
Figure 10:
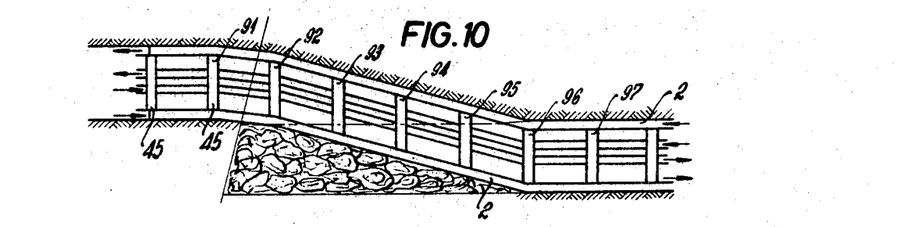

In the drawings FIGS. 1 to 8 as well as the representations in FIGS. 9 and 10 relate to that form of the invention wherein the additional extraction device has a cutting or stripping action whilst FIGS. 11 to 23 relate to that form of the invention wherein the additional extraction apparatus has a grooving action.

Figure 1:
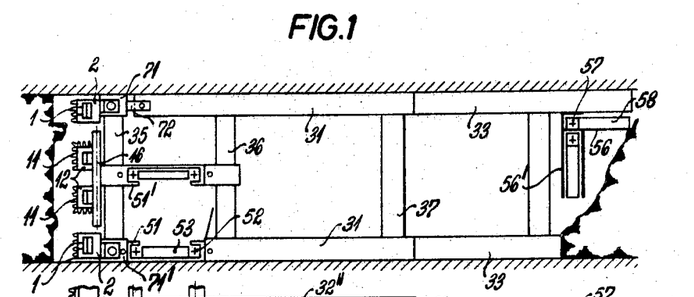
FIG. 1 shows a cross section through the long wall face.

In FIG. 1, as contrasted with the actual conditions at the face, the long wall coal face is represented for the sake of clearness somewhat set back from the extraction apparatus. The profile of the coal face shows the trench made by the main cutter chain 1 at the roof and floor as well as showing the action of an additional cutter chain 11 running between the flights of this main cutter chain, and the two flights of this additional cutter chain in their rail guides 12 are shown at the illustrated time instant as progressing directly in a direction from the floor to the roof.

The slope of the coal face visible underneath the lower flight of the additional cutter chain 11 results from the fact that the cutter chain 11 during its upward progression corresponding to the advance of the main cutter chain 1 has slowly penetrated further into the face. In a similar manner the slope of the coal face visible above the upper flight of the additional cutter chain 11 has resulted during the preceding downward progression of the cutter chain 11. A part of the latter slope has already been removed by the upwardly projecting cutter picks of the additional cutter chain 11.

Figure 2:
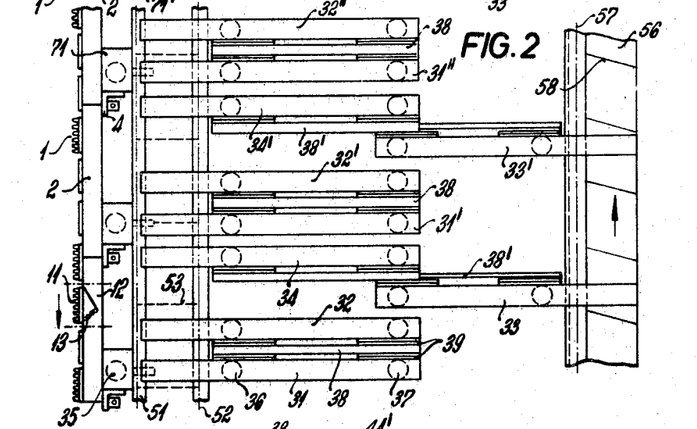
FIG. 2 is a plan view of a part of the long wall face and one form of construction of the novel extraction apparatus.

In FIG. 2 the last section of the rail guide 2 for the main cutter chain has been partially cut away in order to reveal also in this view the underlying rail guide 12 with the cutter chain 11 guided therein. Thereby is shown an inclined guide surface 3 for the upwardly directed cutter picks of this cutter chain.

Figure 4:
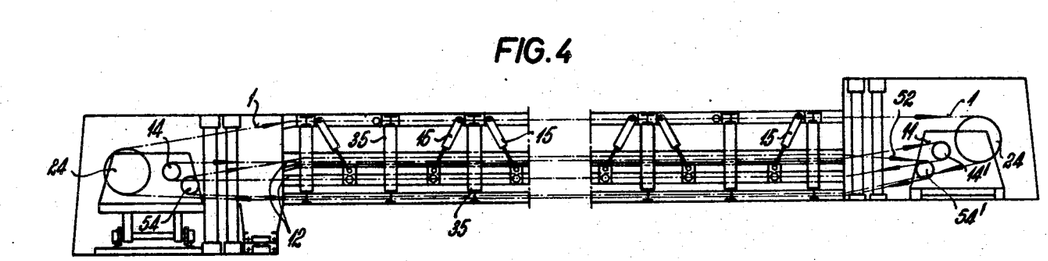
FIG. 4 shows the same extraction apparatus in a longitudinal section through the long wall face.

FIG. 4 shows also the reversing and drive sprockets 24, 24', and 14, 14', for the cutter chains 1 and 11 arranged in the end roadways, as well as showing the jacks 15, whose simultaneous retraction and extension cause the up and down movements of the guides 12 of the additional cutter chain 11.

Figure 3:
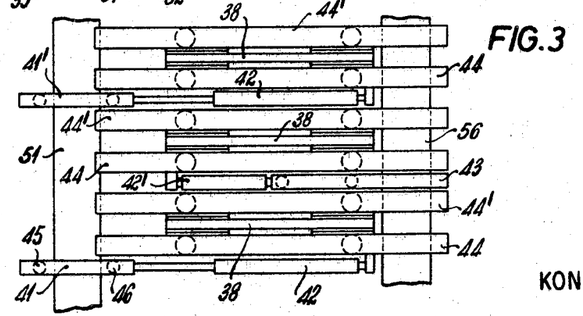
FIG. 3 illustrates another form of the face support system to be employed for advancing the extraction apparatus and is shown in a different phase of the forward movement.

The extraction apparatus is driven forward according to FIGS. 1 and 2 by frames 31, 31' and in accordance with FIG. 3 by frames 41, 41'. The support of the additional cutter chain upon the said frames is effected by means of the guiding means 16 associated with the props at the coal face side. During the extraction operation these frames are set with a comparatively low setting load representing to a certain extent a "yieldable pressure." They are under the influence of a forward driving device 38 or 42, which continually exerts a forward pressure on these frames. The pressure space of the props 35, (45) situated at the coal face side has a larger cross section than that of the props 36, 37 (46) situated at the wasteside.

The frames 31 are connected by the drive device 38 to the frames 32 set under full load, and form with them a truss. The deflection of their roof caps and/or sole plates with respect to the corresponding elements of the adjacent frames is made possible, for example, by arranging that the drive device 38 is linked at both sides to these caps by means of double hinge arms 39. Between each two frame trusses 31, 32 (31', 32') there is arranged a truss 33, 34 (33', 34'). Whilst the frames 31, 31' are associated with the extraction apparatus and the scraper conveyor 51 conveying the extracted coal, the roof caps of the frames 33 have suspended from them the waste side conveyor 56. The frames 33 are preferably likewise set with a "yieldable pressure" and are supported with respect to the frames 34 set under full load and are stepwise displaced by the drive device 38'. Because the drive forward of these frames proceeds in steps and not continuously it can be effected also by alternate setting (with full load) and releasing.

The initial position of the frame will be assumed to be that shown in FIG. 2. At the end of the following phase the drive devices 38 have been extended, the drive devices 38' have been retracted and the frames 31, 31', 33, 33' have been driven forward by one field width. Thereupon whilst interrupting the extracton by only a short time these frames are set under full load and the frames 32, 32' 34, 34' released, are driven forward by a field width and are again set with full load so that at the beginning of the next phase the intial position according to FIG. 2 has again been reached.

FIG. 3 shows the position of the elements of the face support system reached at the respective end of the phase, of which the frames 41, 41' and 43, whose function is the same as that of the frames 31 and 33 of FIG. 2, are not set in the interim with full load and during the entire coal shift are under the action of the drive devices 42, 42'. The progression of the support trusses 44, 44' will be completed then by alternate setting and releasing their frames in periods which are suited to the forward progression of the frames 41, 41', 43. Instead of using the support truss it is possible also to use support chocks. The design of the long wall support according to FIG. 3 has the additional advantage that the fields of the face, which are supported by a frame system which is set not under full load but with a "yieldable pressure," can be maintained smaller.

Figure 5:
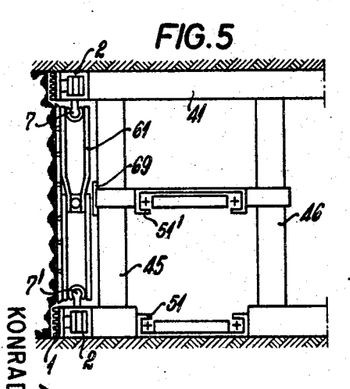
FIG. 5 shows a form of construction with an additional extraction equipment having a stripping action in side elevation.

The conveyance of the coal is effected in the scraper conveyor which can be seen in FIGS. 1 and 5. The channel runners 51 of the forward flight of this conveyor are arranged at the floor and the channel runners 51' of its return flight are suspended between the props 35, 36 and 45, 46 of the appertaining frames. Its drive chain is indicated by 52, its coupling by 53 and its driving and reversing sprocket (FIG. 4) by 54 and 54'.

The flat flange type conveyor serving for conveying the rock at the waste side is visible in FIG. 1. Its forward flight is indicated by 56 and its reverse flight by 56', its conveyor chain is indicated by 57 and its carrier set at an inclined position and thus automatically discharging the material at the waste side is indicated by 58.

Figures 5A, 6:
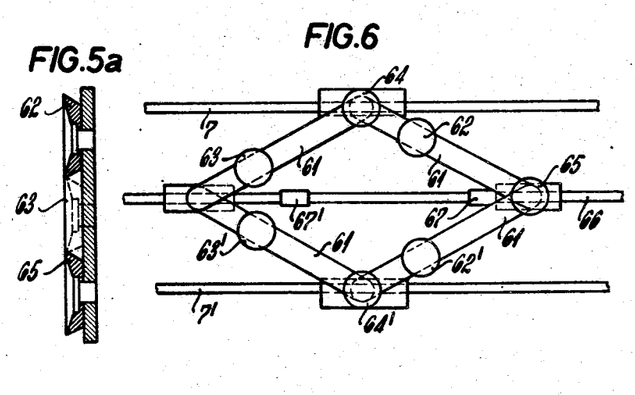
FIG. 5a is a partial view of FIG. 5 on an enlarged scale.
FIG. 6 shows an articulated frame with stripping tools in a front elevation.

The structural form of the additional extraction apparatus for breaking up that part of the face situated between the trenches produced by the main cutter chain, and operating as a stripping device is shown in FIGS. 5 and 6. The stripping tools 62, 62', 63, 63', 64, 64', 65 in the shape of frusto-conical bodies, which in accordance with FIG. 5 are situated within the coal face and consequently are not visible, are arranged upon a quadrilateral linkage 61, whose upper and lower linkage points are arranged upon the guide members 7, 7' associated with the rail guides 2 of the main cutter chain. The quadrilateral linkage can open and close in the manner of a tongs and consequently accommodates itself to the spacing of the guide members 7, 7'. A plurality of such frames of groups of stripping tools are arranged in succession in the longitudinal direction of the long wall face. They are reciprocated by a common actuating means 66, whilst stops 67, 67' transmit the force in the one or the other direction. The quadrilateral linkages support themselves upon the frames 31 (41) upon guide members 69 extending from one frame to the next.

The control of the rail sections 2 of the main cutter chain is illustrated in FIG. 7 (in plan), and in FIG. 8 (as a side view), these being examples of possible constructions. Upon the prop 5 there is arranged an intermediate member 71 which is movable with respect to the prop, for example bears by means of a spherical cup upon a spherical head. The intermediate member is jointed and supported by means of a lug 72 upon the roof cap of the frame 31 and the conveyor 51. The angle bar 4 is connected to the intermediate member 71 by the bolt 6 and is tiltable with respect thereto. This angle bar has a circular cavity which forms an anchorage for the half round bolts 3, 3' which are arranged upon the ends of adjacent sections of the rail guide 2 of the main cutter chain 1. After introducing the half round bolts 3, 3' into the hole in the anchorage member 4 the half round bolts and thereby the rail sections are secured by the introduction of a locking pin 5.

Upon a plate 73 of the intermediate member 71 there is supported the adjusting device, which operates by means of a wheel 74 upon a shaft 75, which in turn adjusts the height of a bolt 76, which is arranged upon the anchorage member 4. Thus by operating the wheel 74 the anchorage member 4 is rotated about the axis of the bolt 6 and the angular position of the rail sections 2 of the main cutter chain is correspondingly influenced with respect to the upper wall or the foot wall.

FIG. 9 shows the cutting through of a fault occurring in the run of a seam, this being done by an extraction device arranged either in the face 81 or the face 82. It has been assumed that the adjacent rock of the floor is softer than that of the roof. Consequently the floor is penetrated immaterial of the fact whether the extraction apparatus in face 81 or in face 82 is to overcome the fault. The rail sections 2 of the main cutter chain are adjusted for this purpose at such an angle to the top wall and the foot wall that the face is guided gradually from the level at which the fault is situated to the level in which it must be situated behind the fault and the angular position of the cutter chains is changed at such an instant in the excavating process that the overcoming of the level difference is effected by cutting through the floor and not through the roof.

FIG. 10 shows the cutting through of a fault occurring in the sip. It has been assumed that the adjacent rock of the roof is softer than that of the floor. Upon encountering the fault, the angle under which the cutter chain operates is adjusted to an increasing degree by tilting the rail sections 3 in the anchorages of the frames 97, 96, 95 and so on so that the trenches penetrate increasingly into the roof and the elements of the support system following the advance of the trench gradually progress upwardly, because at the floor the same angular adjustment has been effected.

The frames 41 which are alone visible in the drawing, to which the rail sections are pivoted, must remain parallel to each other because the lengths of the rail sections joining them do not vary. On the other hand those support frames of the advancing support system which follow them and which are set under full load can stand normally with respect to the strata. Whilst the rail sections linked to the frames 91, 92, 93, which have again reached entirely or substantially the level of the seam, are gradually swung back again into their normal position, the total course of the cut represented in FIG. 10 is finally reached.

Figure 11:
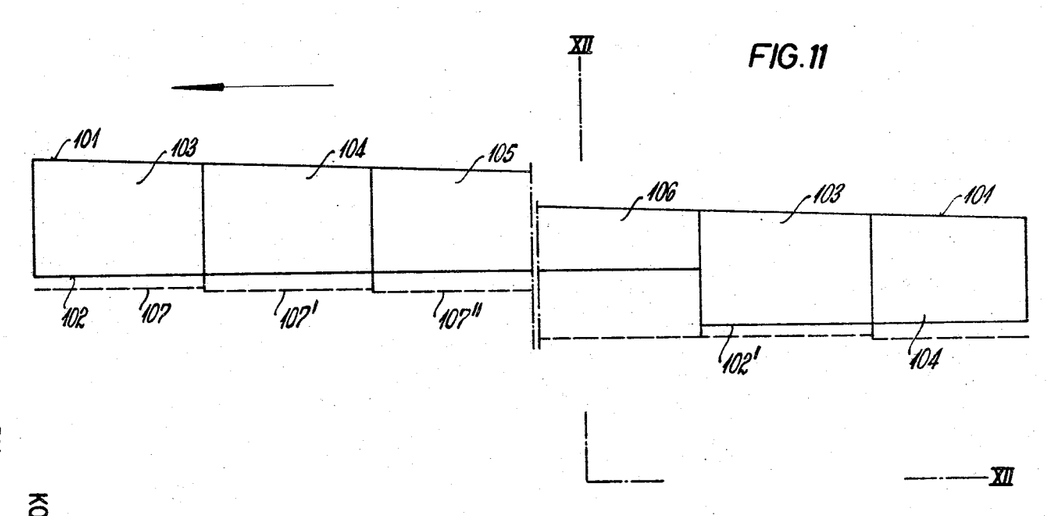
FIG. 11 shows a purely schematic representation (in plan) of the advancement of the extraction apparatus in accordance with the invention using that form of construction wherein the additional extracting devices operate upon the grooving principle and wherein (exclusive to this figure) the dimensions in the advance direction are represented upon a substantially larger scale than those in the longitudinal direction of the long wall face because otherwise the inclinations of the working face with respect to the guide rails of the cutter chain would not be visible.
Figure 12:
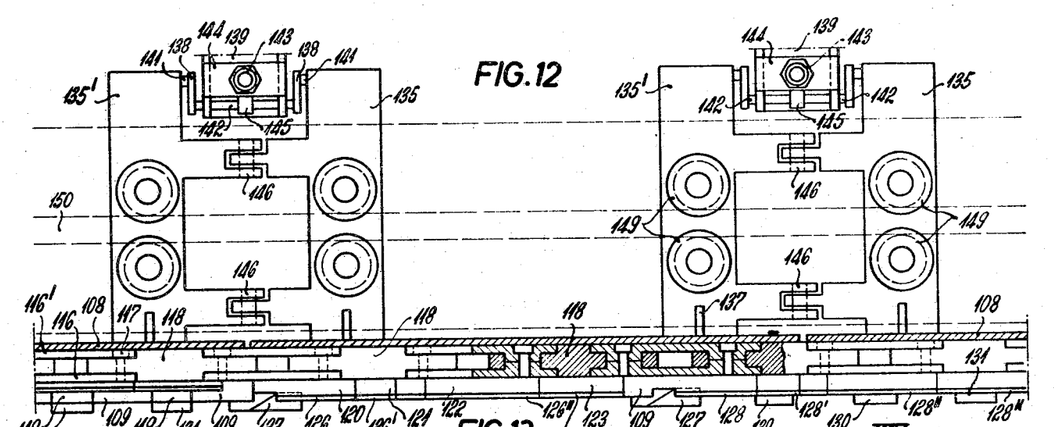
FIG. 12 shows a plan view of a part of the extraction device installed at the floor level and in partial section along the line XII—XII of FIG. 14.
Figure 13:
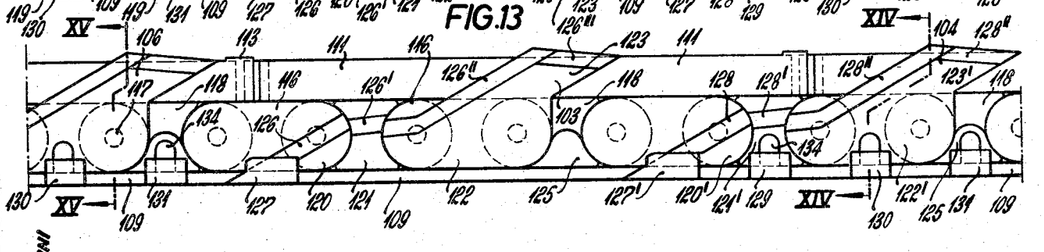
FIG. 13 is a front elevation of the same part.

The operation represented in FIGS. 9 and 10 is basically carried out in the same way if, in accordance with FIGS. 11 to 23, the additional extraction device associated with the main cutter chain has a grooving action. FIG. 11 serves to show a purely schematic representation of the forward advancement of such an extraction apparatus. The cutter chain not shown in the drawing moves in the direction of the arrow in the guide rail, whose edge covering the cutter chain at the face side is indicated by the reference 101. Between the cutter chain and the working face 102, 102' there are arranged the extraction tools 103, upon which follow clearing tools 104, 105 etc. of decreasing thickness. Between the clearing tools 105 and 106 it is assumed that there are arranged a large number of such tools, and following upon the last and thinnest of these clearing tools 106 there follows a new extraction tool 103 which advances the working face 102 to the position 102'. Upon this second extraction tool there follows again a similar series of clearing tools. In front of the working face 102, 102' there runs the channel made by the cutting elements, whose forward edge is indicated by the lines 107, 107', 107''. Actually the progressive deepening of the channel does not begin at the same point where a new clearing tool begins, but with the groove which is produced by the first cutting tool of the first cutting element associated with this clearing tool. Only when all of the cutting tools of the cutting elements which are associated with the respective clearing tool have made their grooves, is the channel actually deepened to the indicated extent.

In order to show in a simplified manner the deepening of the channel and the advance of the working face, steps coinciding with the beginning of the tools are shown to an exaggerated amount between the lines 107, 107', 107'' and 102, 102'. Just as the indicated depth of the channel is actually only completed when all of the cutting tools associated with a clearing tool have come into operation, so also is the advance of the working face from 102 to position 102' only completed after the entire length of the rising wedge surface of the extracting tool 103 has come into operation, even though this wedge surface has already begun to operate from the beginning in the direction of the new working face. The fact that the lines 101 and 102 slightly converge upon one another is only visible by reason of the greatly exaggerated scale. If, as in FIGS. 12 to 23, the measurements lying in the feed direction were to be represented upon the same scale as the measurements proceeding in the longitudinal direction of the long wall, then the lines would appear to be exactly parallel.

The stated constructional form of the invention is illustrated in detail in FIGS. 12 to 23. The U-shaped guide rail sections for the cutter chain have the web 108 and also have an extended flange 109 bearing against the floor or against the roof and—opposite to this—a flange 110 which is provided with an extension 111. Insofar as the guide rail sections are arranged at the floor, there is fixed to this extension 111 a bar 112 extending over the conveyor. In the region of the extension 111 and of the bar 112 the succeeding sections of the guide rails exhibit at the junction points an overlapping 113. Moreover they are provided at the junction points with studs 114 which engage with clearance in cavities 115 of the adjacent rail section.

In these guide rail sections runs the cutter chain which is designed as a link chain. Its outer straps 116, 116' are held together by screws 117 and its inner straps 118 are thickened in the region between two succeeding pairs of outer straps 116 (116') in such a manner that the chain exhibits both at the waste side as well as the face side a continuous surface.

Upon each three successive straps—namely an outer strap 116, an inner strap 118 and the next outer strap 116—there is fixed at the face side a three-part extracting tool 102 or a three-part clearing tool 104 (or 105, 106). In the front elevation (FIG. 13) the clearing tools and the extraction tools are the same. They slide upon the extended flange 109 of the guide rail. The extraction tool 103 and the clearing tool 104 extend over the entire width of this flange insofar as it is not required for guiding the cutter chain. As regards their parts 119 extending into the channel, the succeeding clearing tools 105 etc. to 106 exhibit the same thickness, that is to say these parts extend respectively from the face side of the appertaining chain strap 116 (118) up to the face side edge of the extended flange 109. However as regards its parts arranged in the upper part of the channel (and as regards the roof underneath the channel) the succeeding clearing tool is thinner than the preceding tool.

Since the respective forward surface of these parts bears upon the working face, the thickness of these parts determines how closely the entire face support system shall be forced under the action of the continuously operating driving devices towards the face and also how deeply the forward edge of the extended flange of the guide rails can be pushed into the channel which advances in front of the face. Therefore with the forward progression of the cutter chain in the longitudinal direction of the long wall face there is associated a very gradual but continuous forward movement of the support system in the direction towards the face.

Figure 14:
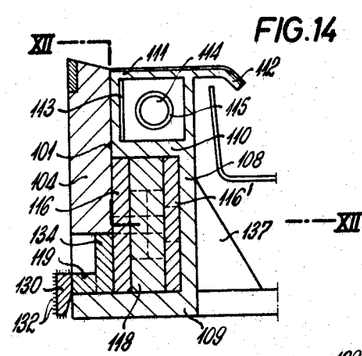
FIGS. 14 and 15 show a cross section along the lines XIV—XIV and XV—XV of FIG. 13.
Figure 15:
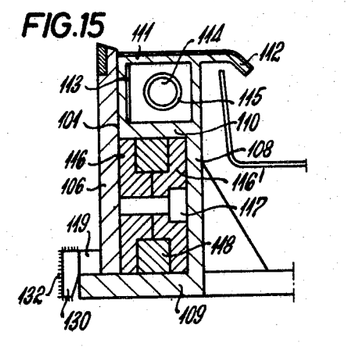
Figure 16:
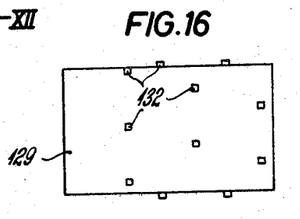
FIGS. 16, 17 and 18 show on an enlarged scale a front elevation of the succeeding stripping elements of a group which employ diamonds as the cutting tools.
Figure 17:
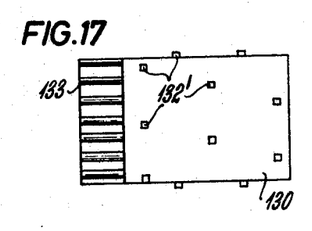
Figure 18:
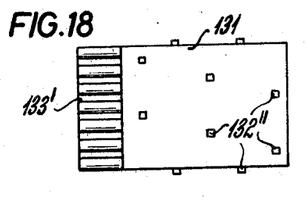

At the same time at which those members of the cutter chain provided with a stripping tool 105 arrive at that point, at which previously the members of the cutter chain provided with a clearing tool 104 had been situated, the guide rail forces the cutter chain onto the existing working face by an amount illustrated by FIGS. 14 and 15, whereby the channel is deepened by the same amount. The next members of the cutter chain are again combined with an extraction tool 103 which advances the face being worked in the plane of the forward edge of the extended flange 109 of the guide rail, whereby the position of the guide rail is only influenced to such an extent that now the same cycle can begin afresh. The extraction tool 103 begins with a first part 120 associated with an outer strap 116. The wedge surface 124 of the tool inclined towards the open space of the working begins upon the extended flange 109 of the guide rail and rises at the part 120 in a region lying below the upper edge of the strap 116. The rear edge of the part 120 coincides with the arcuately shaped rearward edge of the strap 116. The second part 121 of the extraction tool 103 is mounted upon the thickened part of the connected inner strap 118. Its forward edge and its rearward edge coincide with the arcuate shaped edges, with which this thickened portion of the inner strap 118 connects to the adjacent outer strap 116. Only the slightly rising wedge surface of the part 120 begins somewhat below the discharge end of the wedge surface of the part 120. The third part 122 of the extraction tool 103 is mounted upon the following outer strap 116. Its wedge surface begins somewhat below the discharge end of the wedge surface of the part 121 and rises up to a point extending beyond the extension 111 of the guide rail. Following this the part 122 exhibits also an extension 123, which with a somewhat declining surface covers the region of the next inner strap 118.

The forward edge of the part 122 and at least the lower region of its rearward edge again coincide with the arcuate shaped parts of the appertaining outer strap 116. The following inner strap 118 can be provided at its thickened portion with an intermediate member 125, which, like the extension 123, bears against the new working face formed by the extraction tool. The cutting edge of the wedge is provided with an upset knife 126, 126', 126'', 126''' which has a clearance angle as may be seen in FIGS. 22 and 23.

The part 120 of the extraction tool is provided at its forward end with a shoe 127 extending into the channel, which shoe clears the channel of small cuttings and discharges the small cuttings onto the extended flange 109, where it is taken up by the wedge surface of the extraction tool and so increases the pressure of the wedging surface against the available coal. For the performance of the grooving extraction method it is of special advantage that the extraction tool should during its advance bear over its entire width upon the extended flange 109 of the guide rails, so that it does not penetrate into the floor or into the roof, but while supporting itself upon this continuous wide supporting surface can direct its grooving forces fully against the seam.

In the space between the link chain and the old working face, which is determined by the width of the last clearing tool, there may be set up upon the wedge surface of the extraction tool an abutment wall which is likewise fast upon the appertaining straps, which abutment wall prevents deflection of the removed material into this space and thus substantially reinforces the pressure which is exerted by the extraction tool upon the existing coal or which is exerted by the tool upon the encountered adjacent rock when cutting through a fault.

The clearing tools 104 are differentiated from the extraction tools 103 first of all by virtue of the fact that the knives 128, 128', 128'', 128''' mounted upon the succeeding parts 120', 121', 122', 123', have no angular clearance. In its normal position (FIG. 22) this knife moves like the entire clearing apparatus, along the face without penetrating therein. If the clearing apparatus is inclined towards the face (FIG. 23) in order to penetrate the channel in the foot wall or the top wall of the seam, then the knife cuts freely.

Furthermore the clearing tool 104 is distinguished from the extraction tool 103 by virtue of the fact that upon the surface at the face side of its part 121' there is mounted the cutting element 129 extending into the channel, whilst at the face side surface of its part 122' there is mounted the cutting element 130. Upon the outer strap provided with the parts 122', 123' of the clearing device follows an inner strap 118, which is provided with an intermediate member 125 likewise extending to the face and serving as a support for the cutting element 131.

The cutting elements 129, 130, 131 form together a group of cutting elements which deepens the channel by a definite amount, for example by 1 mm. These cutting elements are fitted with studs 132, 132', 132'', which themselves support the cutting tools consisting of diamonds for example. Each of such cutting tools cuts a groove in the wall of the channel. In the channels which have been made by the element 9 by means of the cutting tools arranged upon its studs 132, there will engage the following cutting element 130 with its comb 133. The cutting tools associated with its studs are therefore prevented from moving into the same grooves and must cut new grooves in the wall of the channel adjacent the already available grooves. The present grooves are therefore of double the width so that the comb 133' associated with the following cutting element can have teeth of double the width, between which the cutting tools associated with the studs 132'' can remove the still remaining parts of the wall of the channel to the prescribed depth. The teeth of the comb 133 and 133' are represented only at the forward end of the cutting tool. These do not extend uninterrupted up to the rear end of the cutting element, because this would interfere with the clearing away of the small cuttings, but they can however be continued stepwise also on the rearward parts of the cutting elements.

After this deepening of the channel has been carried out there follows upon clearing tool 104 the correspondingly thinner clearing tool 105 again provided with cutting elements 129 and 130. In order that these cutting elements shall be able to further deepen the channel, they are mounted upon that part 119 of the clearing tool which reaches into the channel. The part 119 will extend in any case from the face side surface of the link chain up to the forward edge of the extended flange 109 likewise penetrating into the channel. Its forward side requires to have no greater length than the cutting element 129 (130) which is to be fixed thereto. It is purely a manufacturing problem whether this part 119 shall consist of one piece together with the part 121' (122') of the clearing device bearing against the excavated face, and the cutting element 129 (130) fixed thereto, or vice versa as is indicated in the drawings, wherein the part 119 consists of one piece together with the cutting element 129 (130), which is inserted in a cavity of the part 121' (122') and is fixed, for example by a screw, to the strap 116 (118) by means of a projection 134 likewise introduced into a suitable cavity of the part 121' (122'), and in this manner connected to the part 121' (122'), which itself may consist of one part together with the strap 118 (116).

Figure 19:
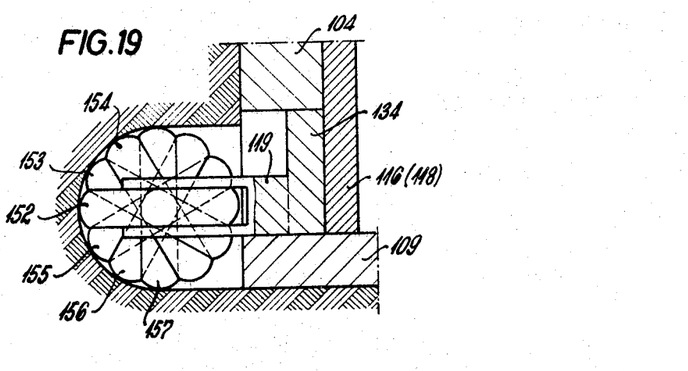
FIGS. 19, 20 and 21 show likewise on an enlarged scale in a section similar to that in FIG. 14 a group of successive stripping elements designed as rotary chisels, as well as showing individual rotary chisels with their mounting supports.
Figure 20:
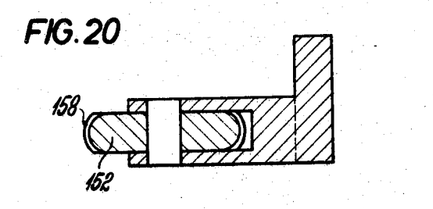
Figure 21:
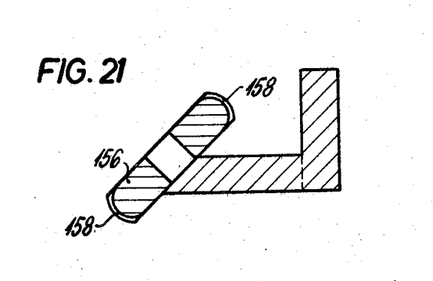
Figure 22:
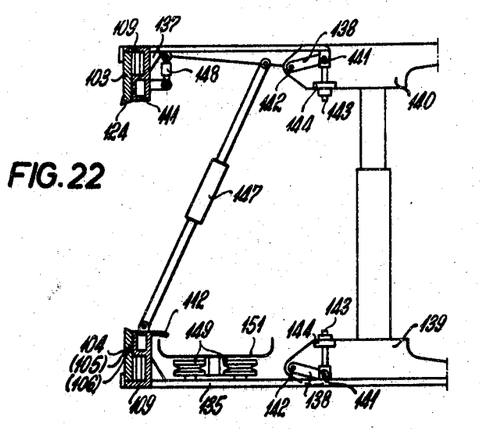
FIGS. 22 and 23 finally show the adjusting devices in various positions for the guide rail sections of the cutter chain arranged at the floor and the roof.
Figure 23:
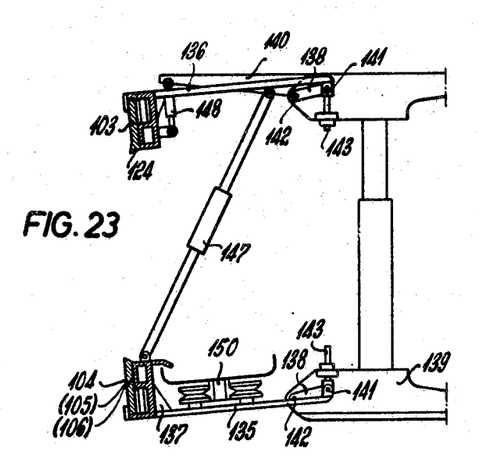

The same considerations apply for the connection of the cutting element 131 with the intermediate member 125 and with the appertaining inner strap 118. Instead of using the cutting elements 129, 130, 131, which have diamonds as the cutting tools, it is possible also to introduce cutting elements 152, 153, 154, 155, 156, 157 which are designed as rotary chisels. In this case either the cutting elements 152 to 157 are twice as closely set as the cutting elements 129 to 131, or else the rotary chisel 152 will be used in place of the cutting element 129, 153 in place of 130, 154 in place of 131 and so on, whereby consequently a group of rotary chisels 152 to 157 is distributed over two successive clearing tools. The design of the holding means for the rotary chisels 152 to 157 illustrated by FIGS. 20 and 21 corresponds basically to the design of the holding devices for the cutting elements 129 to 131. The cutting surface 158 of the rotary chisel exhibits a rounded profile in order that the rotary chisel can be controlled appropriately in any desired direction. If the cutting surfaces were to be made straight, then the corners would blunt very quickly so that the rotary chisel would be unstable and could no longer be controlled. Preferably all of the rotary chisels do not operate in the same plane, but the cutting planes of the succeeding rotary chisels of a group are arranged, as shown in FIG. 19, at different angles to the plane in which the channel is to be driven forward. The profile of the channel when using the rotary chisels according to FIGS. 19 to 21 is assumed to be somewhat larger than when using cutting elements according to the other figures.

In order to allow control of the extraction apparatus, the guide rails of the cutter chain arranged at the floor are connected to plates 135, 135', whilst the guide rails arranged at the room are connected to suitable levers 136. Gusset plates 137 are used to strengthen this connection. At their rearward ends these plates (levers) are connected through rocker arms 138 with the sole plates 139 and with the roof caps 140 respectively. The rocker arms 138 are linked by means of a pivot axis 141 to the plate. At its other end there is arranged a shaft 142 rotatably mounted in the cap but not rotatable with respect to the rocker arms. Upon the shaft 142 operates an adjusting device, for example an eye bolt 143, which can be adjusted with respect to a cross member 144 fixed to the cap, whereby a lever 145 extending parallel to the rocker arms 138 and likewise not rotatable with respect to the shaft 142 can operate through the shaft 142 upon the rocker arms in such a manner that their pivot axes 141 will rise or fall in accordance with the adjustment of the eye bolt 143.

Obviously it is also possible to use a constructional form, wherein the adjusting device operates directly upon the pivot axes 141. In each case the plates 135, 135' or levers 136 associated with the same cap will be uniformly raised or lowered at their rearward ends. If the adjusting devices associated with the adjacent caps 139 (140) are adjusted to the same extent then the succeeding guide rail sections of the cutter chain maintain their positions with respect to each other. If these adjusting devices are not operated or are operated in a different manner then the succeeding guide rail sections deflect in a corresponding manner with respect to each other, whilst the joints 146 which connect together the plates 135 and 135' are correspondingly displaced. However the height position of the oppositely directed ends of adjacent guide rail sections remains the same. Between the levers 136, which are associated with the same roof cap 140 but with different guide rail sections, there can be arranged a suitable hinge joint before the face side end of the roof cap.

By means of the adjusting device 143 the rearward end of the plate 135 or levers 136 is moved away from the floor or the roof. By this means the result is achieved that the channel made by the cutting elements penetrates more deeply into the floor or the roof (FIG. 23) in the lower flight of the cutter chain. If the plane in which the channel is driven forward is to have an inclination in the opposite sense, then other adjusting devices will thus be operated which influence the forward end of the plates 135 or the levers 136 (FIG. 23) in the upper flight of the cutter chain. For this purpose the guide rail sections of the cutter chain arranged at the floor are connected by an adjusting device 147 to the roof caps 140.

This is designed for example as a locking strut or as a jack. The guide rail sections arranged at the roof can be connected to the forward end of the roof caps by an adjusting device 148 which is similarly designed.

Upon the plates 135, 135' there are arranged stationary pairs of rollers 149, which carry the support members of the conveyor forming a continuous support strip 150, upon which are fixed the overlapping trough plates 151 of the conveyor. The transverse limit of the support members and the trough plates is indicated by dashed lines in FIG. 12. Such a conveyor is particularly suited to be guided in a curve out of the long wall face into a roadway extending approximately at right angles to the face so that the conveyed material can be transported directly out of the long wall face into the roadway without the interposition of a transfer point. In this way disturbances are avoided and a rapid discharge of the material is ensured such as is necessary due to the quick advance of the excavation which is achieved. The single flight conveyor which of itself does not form a part of the invention, moves out of the charging zone through a side roadway and the head roadway back into the face and during the conveying operation at the transitions from the long wall face into the roadways allows itself to be extended in each shift by an amount corresponding to the advance of the excavated face.

The invention is not restricted to the form of construction described above in detail and represented in the drawings, and is furthermore not restricted to the simultaneous common application of the described methods. On the contrary variations are possible without departing from the basic concept. Furthermore the support method described and illustrated herein can be applied advantageously in combination with other extraction apparatus.

I claim:

1. Apparatus for the mechanical extraction of coal and other minerals by the long wall method comprising an advanceable support framework, interarticulated guide rail sections carried by said support framework, a link cutter chain operating in said guide rail sections, mineral removing elements carried at the face side of said chain links, said elements including main cutting elements for producing a channel in advance of the face of the excavation and clearing tools having surfaces bearing against the face being worked rearwardly of such channel in such manner as to limit the forward advance of said support framework, and means for angularly adjusting said guide rail sections with respect to the horizontal axis, thereby to alter the angle of attack of said cutter chain with respect to the excavation face.

2. Apparatus as claimed in claim 1, comprising means to cause the surface of said clearing tools to bear against the excavation face to provide a seal with such face to restrict the retrograde movement of cuttings into the channel, said clearing tools being closely spaced to militate against small cuttings from passing back into the channel.

3. Apparatus as claimed in claim 1, comprising clearing tools having parts bearing against the excavation face of decreasing thickness, and cutting elements projecting into the channel of constant thickness.

4. Apparatus as claimed in claim 1, comprising a wedge-shaped excavation tool on said cutter chain in rear of said clearing tools to take a groove from the channel after the latter has reached a predetermined depth for advancing the excavation face a predetermined extent.

5. Apparatus as claimed in claim 1, comprising a lateral flange on said guide rail sections, a shoe on said cutter chain to travel along said flange for deflecting small cuttings into the space above said flange, and other deflecting surfaces associated with said shoe for discharging such cuttings into the space between the excavation face and the links of said cutter chain.

6. A grooving and clearing tool as claimed in claim 5, wherein the point of the shoe is arranged approximately underneath the front pivot axis of that link of the cutter chain which is associated with the forward part of the grooving tool and clearing tool.

7. A three-part grooving tool and clearing tool as claimed in claim 5, wherein the discharge end of the wedge surface of the first part and of the second part are arranged underneath the upper edge of the links of the cutter chain and above the beginning of the wedge surface of the second part and the third part, whilst the third part is provided following the highest point of the wedge surface of the tool with an extension having a somewhat backed off surface which engages over the intermediate member arranged upon the next link.

8. Apparatus as claimed in claim 5, comprising a wedge surface rising from said guide rail flange and inclined in a direction towards the open working space, the wedge surface of the grooving tool being underneath the face while the wedge surface of the clearing tool is disposed adjacent the face.

9. A grooving tool as claimed in claim 8, having an abutment wall set up upon the wedge part and covering the space between the working face and the links of the cutter chain.

10. Apparatus as claimed in claim 1, comprising a cutting element provided with three outer faces for engaging the excavation face, studs on said faces arranged in a staggered transverse manner with respect to the forward movement, and cutting implements in said studs respectively.

11. Apparatus as claimed in claim 10 comprising a plurality of clearing tools arranged in sequence upon said cutter chain, cutting elements on said clearing tools, comblike extensions on the second and subsequent cutting elements for engaging channels formed by preceding cutting elements said extensions being arranged in a leading position with respect to the cutting elements carried by the same clearing tool as regards the line of chain travel, and being disposed as regards the height of the excavation face in interposed positons between the previous cutting elements.

12. Apparatus as claimed in claim 1 comprising a cutting element in the form of a rotary chisel having cutting surfaces of rounded profile.

13. Apparatus as claimed in claim 12 comprising a series of rotary chisels along said cutter chain, each chisel being disposed at a different angle to the advancing plane of the apparatus.

References Cited

UNITED STATES PATENTS

| 75,230 | 3/1868 | Wickersham | 299—82 X |
|---|---|---|---|
| 1,404,835 | 1/1922 | Christine | 299—83 |
| 1,677,399 | 7/1928 | Morgan | 299—84 |
| 2,229,214 | 1/1941 | Lacher | 299—82 X |

FOREIGN PATENTS

| 879,238 | 6/1953 | Germany. |
|---|---|---|
| 1,025,808 | 3/1958 | Germany. |

ERNEST R. PURSER, *Primary Examiner.*